Oct. 14, 1969     C. LAUTH     3,472,308
METHOD AND APPARATUS FOR PERMANENT MOLD CASTING
Filed Aug. 29, 1966     5 Sheets-Sheet 3

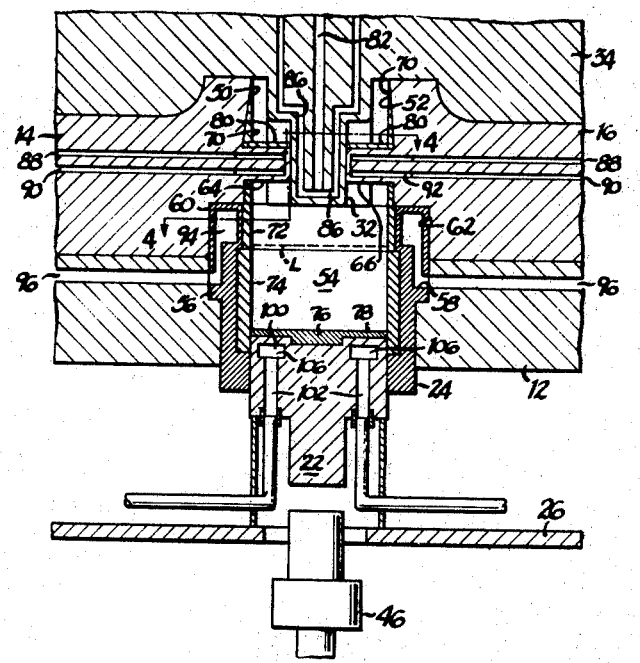

INVENTOR.
Corliss Lauth
BY
WILSON, SETTLE, BATCHELDER
ATT'YS. & CRAIG.

Oct. 14, 1969   C. LAUTH   3,472,308
METHOD AND APPARATUS FOR PERMANENT MOLD CASTING
Filed Aug. 29, 1966   5 Sheets-Sheet 5

INVENTOR.
Corliss Lauth
BY
WILSON, SETTLE, BATCHELDER
ATT'YS.   & CRAIG.

United States Patent Office 3,472,308
Patented Oct. 14, 1969

3,472,308
METHOD AND APPARATUS FOR PERMANENT MOLD CASTING
Corliss Lauth, Dearborn, Mich., assignor to Multifastener Corporation, a Michigan corporation doing business as Cast Forge Company, Livonia, Mich.
Filed Aug. 29, 1966, Ser. No. 580,552
Int. Cl. B22d 15/02, 27/08
U.S. Cl. 164—71                                    9 Claims

ABSTRACT OF THE DISCLOSURE

Methods and apparatus for permanent mold casting of articles capable of producing castings having an extremely dense fine grain structure with minimum porosity and improved physical characteristics. Molten metal within a closed die cavity is subjected to the action of a cooling mechanism, such as circulating water in passages within the cavity-defining die elements, to accelerate the solidification of the casting as a whole. Selected portions of the cavity walls are coated with a thermally resistant material, such as a metallic oxide, to locally retard or delay cooling of certain regions of the casting to achieve a progressive solidification of the casting toward a selected wall of the casting so that throughout the solidification process, that portion of the cooling metal which is still in its liquid state is always in direct fluid tight communication with the selected portion of the cavity wall. Pressure is continuously applied to the cooling metal from the selected wall portion so that metal in the liquid state within the cavity is under pressure at all times.

---

Figure 1:
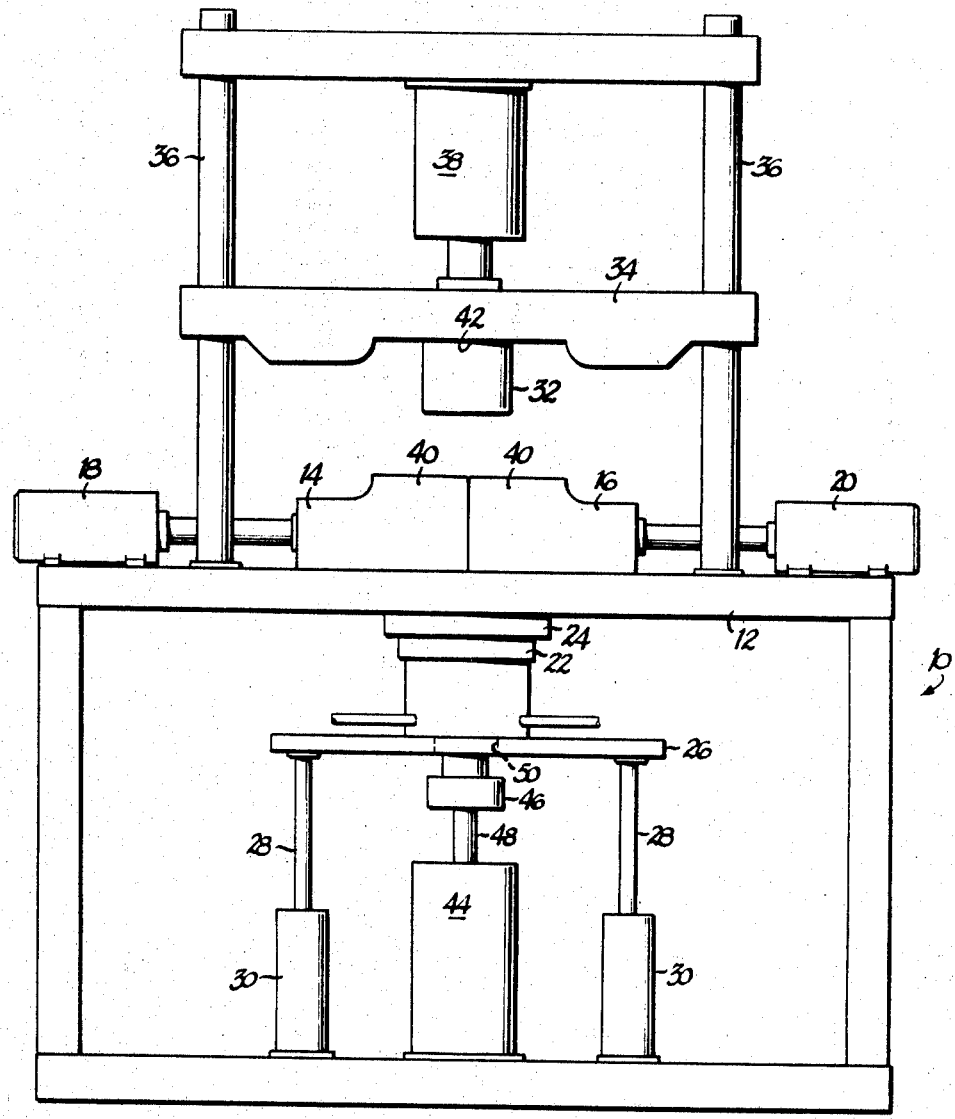

In my United States Patent No. 3,120,038 there are disclosed methods and apparatus for casting a piston from aluminum or aluminum alloys in which improved density and minimization of porosity in the completed casting are achieved by applying pressure to localized regions of the casting to force molten metal from reservoirs into the die cavity to compensate for solidification shrinkage. Solidification shrinkage is an especial problem in the light weight metals such as aluminum and its alloys whose characteristics are such that a substantial reduction in volume occurs as the metal passes from its molten or liquid state into the solid state. In my Patent No. 3,120,038 compensation for this reduction in volume is obtained by locating reservoirs of molten metal adjacent to and in communication with the heavy portions of the casting which are the last to solidify. As the metal within the die cavity solidifies, the metal which is still molten is drawn toward the regions of the casting which have already solidified by the substantial reduction in volume in the solidified region. In my Patent No. 3,120,038, liquid metal reservoirs communicate with the die cavity and by applying continuous pressure to the metal within the reservoirs it can be forced into the die cavity as the casting is solidifying to compensate for the volume lost due to solidification shrinkage.

The present invention has as one of its major objects the provision of permanent mold casting methods and apparatus for making a casting in which voids and pores due to solidification shrinkage are eliminated, and in which is simultaneously achieved an extremely dense fine grain structure having greatly improved physical characteristics.

It is another object of the present invention to provide permanent mold casting methods and apparatus capable of casting an article with a minimum amount of excess material—i.e. gates, runners, risers.

It is another object of the present invention to provide permanent mold casting methods and apparatus capable of rapid and efficient production.

The foregoing, and other objects, are achieved by a permanent mold casting method in which the cooling of molten metal within a closed die cavity is accelerated and in which the solidification of the metal within the cavity is controlled in a manner such that solidification proceeds progressively toward a selected wall of the cavity, against which the final portion of the molten charge solidifies. During the solidification of the molten metal within the die cavity, pressure is applied to the selected wall so that the molten metal within the cavity is always under pressure; the controlled directional and progressive solidification assuring that the body of still molten metal is always exposed to the selected wall. In addition to the steady application of pressure to the molten metal throughout the solidification process, a series of high energy impacts are also applied to the molten metal. The high energy impacts generate shock-waves which travel through the molten portion of the metal charge to pack and, to some extent, to plastically deform the crystals being formed in that zone of the casting where the metal is in a semi-liquid-semisolid state.

From the apparatus standpoint, the foregoing and other objects are achieved by selectively locating coolant passages within the die elements adjacent selected portions of the die cavity to carry off heat from the solidifying metal in a manner promoting the progressive and directional solidification of the metal described above. In addition to the coolant passages, the progressive and directional solidification is more positively achieved by applying to the cavity walls a coating of a metallic oxide having an extremely low thermal conductivity under normal temperatures and a substantially higher thermal conductivity at elevated temperatures. The thickness of the metallic oxide coating on various portions of the die is varied to promote the progressive and directional solidification of the metal within the die cavity. The metallic coating acts, in effect, as a thermal barrier which initially transmits an extremely small amount of heat, but when thoroughly heated has an increase in thermal conductivity which allows the coating to transfer a substantially greater amount of heat within a given time. Effectively the coating acts as a delaying mechanism so that the flow of heat from one portion of the casting can be delayed as compared to the flow of heat from a different portion of the casting. The delay period is determined by the thickness of the coating at the particular point.

The foregoing, and other features, will become apparent by reference to the following specifications and to the drawings.

Figure 4:
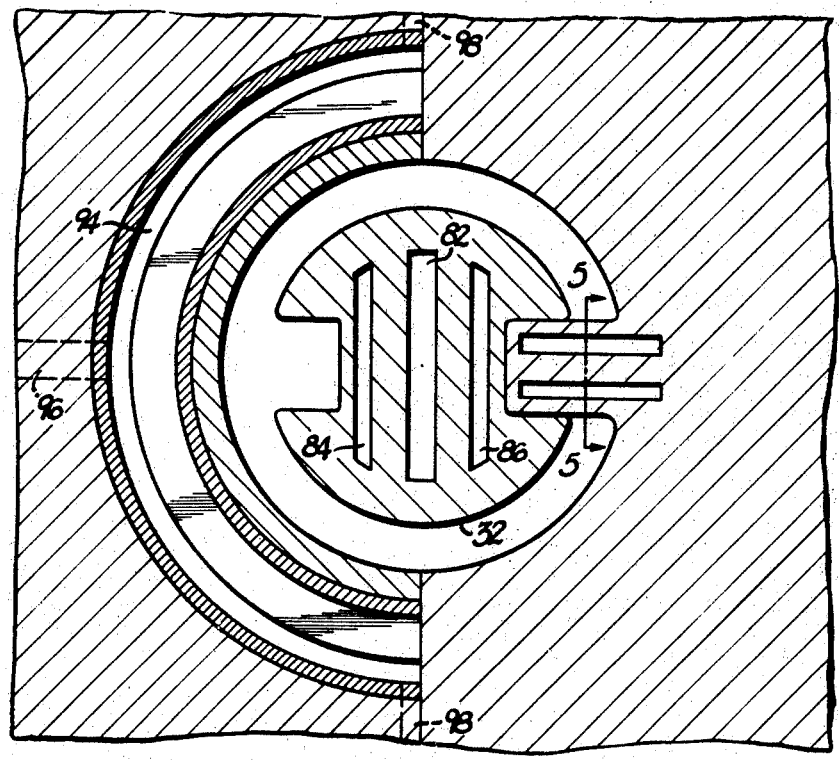
Figure 6:
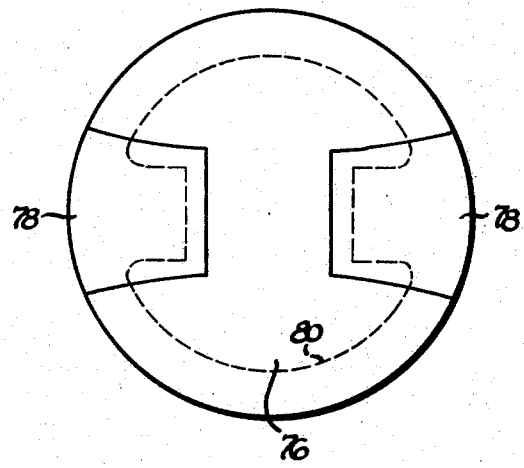
Figure 5:
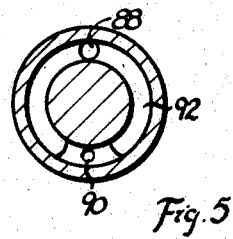
Figure 7:
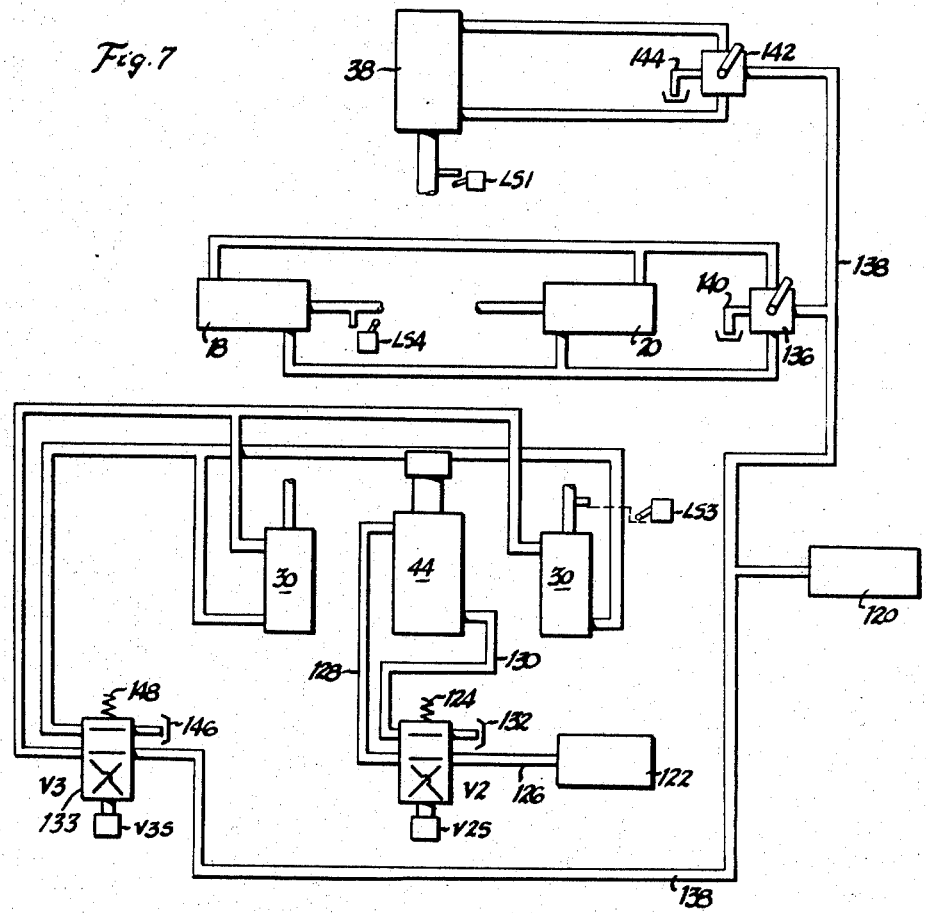
Figure 8:
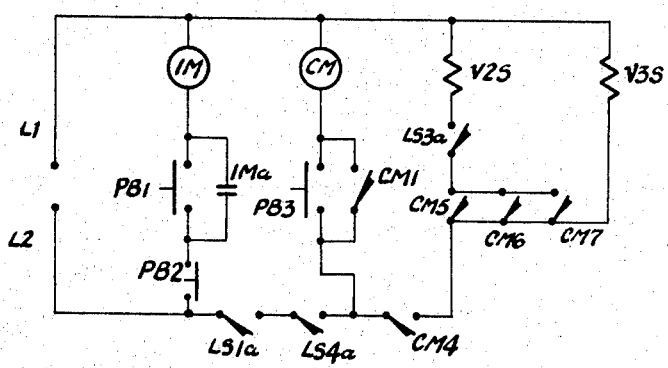
Figure 9A:
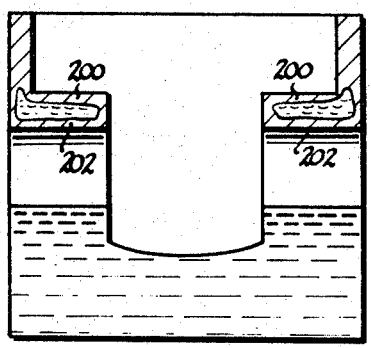
Figure 9B:
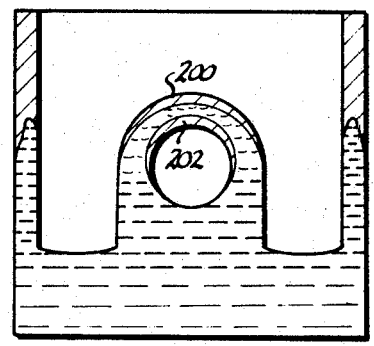

In the drawings:
FIGURE 1 is a side elevation of one form of apparatus embodying the present invention;
FIGURE 2 is a detail cross sectional view taken on a vertical plane through the center of the die cavity;
FIGURE 3 is a detail cross sectional view taken on a vertical plane through the center of the die cavity at right angles to the sectional plane of FIGURE 2 and showing the head forming core in an elevated position;
FIGURE 4 is an offset cross sectional view taken approximately on the line 4—4 of FIGURE 2;
FIGURE 5 is a cross sectional view taken on the line 5—5 of FIGURE 4;
FIGURE 6 is a top plan view of the head forming core;
FIGURE 7 is a schematic diagram of the fluid pressure control system;
FIGURE 8 is a schematic diagram of the electrical control system;
FIGURES 9a and 9b are sectional views at right angles to each other showing the casting at one stage of the solidification process; and FIGURES 10a, 10b and 11a, 11b are views similar to FIGURES 9a and 9b showing subsequent stages of the solidification process.

While the present invention is described in detail below as applied to the casting of an aluminum piston, the invention is equally well adapted to the casting of other articles from other alloys such as steel, brass, copper, zinc, etc.

Referring first to FIGURE 1, there is disclosed one form of apparatus for carrying out the present invention. The apparatus of FIGURE 1 includes a fixed frame designated generally 10 having a horizontal table 12 upon which a pair of opposed split die halves 14 and 16 are supported for sliding movement toward and away from each other. The die halves 14 and 16 are positioned upon table 12 by a pair of hydraulic motors 18 and 20 whose piston rods are coupled respectively to the die halves.

Die halves 14 and 16 define the side walls of the die cavity, while the bottom wall of the cavity is formed by the upper surface of a head forming core 22 which is mounted for sliding vertical movement through an opening in table 12, within which head forming core 22 is slidably guided by a bushing 24. Head forming core 22 is in turn supported upon a lift table 26 which is supported for vertical movement upon the piston rods 28 of a pair of pneumatic motors 30.

The internal surface of the piston to be cast is defined by an inner core member 32 mounted upon a platen 34 which is slidably guided in upstanding posts 36 of frame 10 and is driven in vertical movement by a hydraulic motor 38. In FIGURE 1, the die halves 14 and 16 are shown in their closed position, while the inner core 32 and its platen 34 are in their elevated or open position. Upon actuation of motor 38, platen 34 is driven downwardly until its lower surface contacts the top of die members 14 and 16. Projections 40 on die halves 14 and 16 are formed with curved surfaces which are received within a complementary recess 42 on platen 34 so that when platen 34 is lowered to its closed position, recess 42 receives the projections 40 on the split die halves 14 and 16 to cam and lock the split die members 14 and 16 together.

An impacting device in the form of a pneumatic motor 44 is mounted upon support frame 10 beneath head forming core 22. An impact element 46 is mounted upon the upper end of the piston rod 48 of motor 44 and passes through an opening 50 in support platform 26 to strike or impact the head forming core when motor 44 is actuated.

Details of the die assembly are shown in FIGURES 2, 3 and 4. FIGURES 2 and 3 are detailed cross sectional views taken on planes at right angles to each other. As best seen in FIGURE 2, die halves 14 and 16 are each formed with a semi-cylindrical inner surface 50 and 52 which, when the die halves are closed, forms a smooth continuation of the cylindrical interior 54 of bushing 24. Bushing 24 is formed with an enlarged diameter upper section 56 which is seated upon a shoulder 58 formed in table 12 to position the bushing. Enlarged diameter section 56 of the bushing projects upwardly above the upper surface of table 12 and die halves 14 and 16 are formed with complementary recesses 60, 62 to receive the bushing when the die halves are in their illustrated closed position. Die halves 14 and 16 are both formed with radially extending cylindrical projections 64, 66 which respectively form the piston wrist pin openings in the casting. Inner core 32 is shown in its lowered position in both of FIGURES 2 and 3, and as best seen in FIGURE 2, core 32 projects downwardly between the wrist pin opening forming projections 64 and 66.

In FIGURE 2, head forming core 22 is shown in its lowered position, while in FIGURE 3 the head forming core 22 is in its elevated position.

The die assembly is provided with a cooling arrangement specifically designed to insure that the molten metal within the die cavity solidifies directionally and progressively from the top to the bottom of the casting as viewed in FIGURES 2 and 3. Because the particular piston being cast is of nonuniform cross section having certain relatively thin portions and other relatively heavy thick sections, in order to insure the directional and progressive solidification it is necessary to cool various portions of the casting at different rates or to permit certain portions of the casting to cool immediately while retarding or delaying the cooling of other portions. For reasons discussed more fully below, in order to assure a fine dense grain structure, it is also desirable to accelerate the cooling of the casting as a whole.

To achieve the desired directional and progressive solidification of the metal within the die cavity, a combination of cooling passages and thermally resistant coatings on the die cavity walls are employed. The particular combination and relationship between the cooling passages and coatings shown will vary in accordance with the shape of the particular casting.

In general, the coating employed will take the form of an oxide of aluminum, chromium, iron or other metallic oxide having the desired thermal conductivity characteristics. In general, oxides of this type have extremely low thermal conductivities at normal temperatures and also possess thermal conductivities which increase with increasing temperatures. This particular characteristic is highly desirable for the purposes of the present invention because it affords a means by which the transfer of heat from the molten metal within the die cavity can effectively be delayed while after the desired period of delay heat can be extracted through the coating at a fairly rapid rate. The variation in thermal conductivity with temperature of metallic oxides such as those defined above permits the coatings to act as a thermal barrier which, after a certain time period of exposure to high temperatures suddenly breaks down and, upon breakdown permits a rapid flow of heat through the barrier.

The particular characteristic of the metallic oxide coatings can best be imagined by assuming an oxide coating on a die cavity wall to be contacted on one side by a charge of molten metal. Assuming the coating to be initially at room temperature just prior to the contacting with the molten metal, very little heat is initially transferred through the coating because of its high thermal resistivity. Initially, a relatively thin layer of the coating at the surface contacted by the molten metal will be slowly raised to a temperature corresponding to the temperature of the molten metal. As the time period of exposure to the molten metal increases, the thickness of the heated layer of the coating also increases until eventually the temperature of the entire coating is raised to approximate that of the molten metal. Because of the fact that the thermal resistivity of the coating decreases as its temperature increases, by the time the entire thickness of the coating is at the elevated temperature, its thermal resistivity is substantially reduced and heat can be transferred through the coating relatively easily to the relatively high conductivity metal of the die on the opposite side of the coating. The time period of delay is dependent upon the coating thickness.

Because solidification of the molten must, in any event, proceed inwardly from the die cavity defining surfaces, it is not possible with the relatively complex shape of the piston casting to achieve a uniform downward movement of the solid-fluid metal interface. However, by suitably controlling the cooling rate or by delaying the start of any substantial amount of cooling at various portions of the casting, the casting can be cooled in a fashion such that at no time is a region of fluid metal completely surrounded by firmly solidified metal.

The cooling in the illustrated embodiment of the invention is so arranged that the last portion of the casting to solidify is at the bottom center of the die cavity as shown with the last solidifying portion being in contact with the upper surface of head forming core 22. To achieve this result, the cavity walls are provided with a coating of a metallic oxide, such as chromium oxide for example, as follows.

Referring first to FIGURE 3, the semicylindrical inner walls of die halves 14 and 16 are coated with a layer of oxide 70 which varies in thickness from a minimum thickness near the top of the die half 14 to a maximum thickness at the top of the recess 60 which receives enlarged diameter portion 56 of bushing 24. The variation in thickness may be, for example, approximately .005 of an inch at the top to approximately .020 of an inch at the bottom. Because of this varying thickness, heat can pass radially outwardly through the upper portion of coating 70 earlier and more rapidly than through the thicker bottom portion of coating. That portion of the inner surface of bushing 24 which will be above head forming core 22 during the solidification step is likewise formed with a coating 72 of a thickness approximating the thickness of the lower portion of coating 20, i.e. approximately .020 of an inch. Coatings 72 and 70 cover those surfaces of the die cavity which define the outer side wall of the completed piston.

Referring now particularly to FIGURE 2, a relatively thick coating 74 is applied to the inner surface of bushing 24 to extend downward from the lower edge of coating 72 to a location somewhat below the position of the top of head forming core 22 when core 22 is in its lowermost position as illustrated in FIGURE 2. Coating 74 is of substantial thickness, i.e. approximately .060 of an inch. The function of coating 74 is to prevent or minimize heat loss from the charge of molten metal when it is initially poured into the die cavity. The pouring of the molten metal into the die cavity is done with die halves 14 and 16 retracted or separated and with head forming core 22 in its lowermost position. A measured volume of molten metal is poured into the cavity defined by the interior of bushing 24 and this measured charge, when completely poured, has its upper surface at a level below the top of coating 74. After the charge is poured, die halves 14 and 16 are closed, platen 34 is driven downwardly to position inner core 32 in the FIGURES 2 and 3 position, and head forming core 22 is then elevated from the FIGURE 2 position to the FIGURE 3 position, thus forcing the molten metal upwardly around the sides of inner core 32 to completely fill the closed cavity. Thus, during the period of time required to close the die and to start the solidification process, it is desirable to minimize heat loss from the charge, and it is for this reason that coating 74 is of substantial thickness.

The coating on the top surface of head forming core 22 is of two thicknesses divided approximately as shown in FIGURE 5. Most of the head forming core is provided with a relatively thick coating 76, while the regions 78 are somewhat thinner. The reason for this arrangement is indicated by the broken line 80 of FIGURE 5 which indicates the location of a downward projection of the outline of the inner surfaces of the piston casting, from which it will be seen that the thinner coating portions 78 directly underlie the wrist pin bosses of the casting. Since the wrist pin bosses and the head of the piston represent the most massive sections of the piston, a far greater amount of heat must be extracted from these regions to solidify the casting and the thickness of coating portions 78 is selected to merely delay the transfer of heat from the molten metal through these regions until the die is completely closed and the solidification process can start. For reasons which will be described below, the upper half portions only of projections 64 and 66 are provided with a coating of intermediate thickness 80.

Because inner core 32, during the solidification process, is completely surrounded by metal within the cavity, it has a maximum exposure to heat and a substantial portion of the total heat which is extracted during the solidification process must be extracted through core 32. Therefore, core 32 is either not coated at all or provided with a very thin coating just sufficient to prevent skin formation on the core surfaces during the cavity filling step.

Various cooling passages through which water is circulated to carry off heat are formed in the various members as illustrated. As explained above, inner core 32 must extract a substantial amount of heat from the cooling casting, particularly from the regions adjacent the wrist pin bosses, and a passage system best shown in FIGURES 2 and 4 formed in the interior of inner core 32. A centrally located inlet passage 82 passes downwardly through the center of inner core 32 and branches outwardly near the lower end of the core into two outlet passages 84 and 86. As best seen in FIGURE 4, these passages are of substantial width and cooling water is circulated through these passages quite rapidly during the solidification process. Because the wrist pin boss region is a relatively heavy section of the piston, each of projections 64 and 66 have internal passages having an inlet portion 88 and an outlet portion 90 with an annular section 92 in the interior of the projections.

Bushing 24 is formed with an annular passage 94 which communicates with an inlet passage 96 passing through table 12 in a general vertical plane containing the center line of the wrist pin bosses and with outlet passages 98 located 90° around the piston from inlet passages 96.

Head forming core 22 is likewise formed with an annular passage 100 having inlets 102 and outlets 104 spaced about the vertical axis of the piston casting in general vertical alignment with inlet passages 96 and 98 of the bushing. Annular passage 100 has a relatively deep or wide portion 106 below the wrist pin bosses and a somewhat thinner section 108 near outlets 104.

The various inlets and outlets are connected to a suitable source of water by conventional flexible connections, not illustrated, and water is circulated through the passages in a conventional manner.

A simplified form of control system for the apparatus described above is shown in FIGURES 7 and 8. Referring first to FIGURE 7, a source of hydraulic fluid such as oil under pressure is illustrated at 120 and is connected via conduit and valve means described in more detail below to operate the die half operating cylinders 18 and 20, lift cylinders 30 and inner core cylinder 38. Impact cylinder 44 is connected through a four-way reversing valve V2 to a source of air under pressure 122. Valve V2 is a two position valve which is normally biased by a spring 124 to the illustrated position in which the high pressure outlet 126 of air source 122 is placed in communication with the head end conduit 128 of cylinder 44, while the rod and conduit 130 of cylinder 144 is connected via valve V2 to a vent 132. Valve V2 may be shifted to reverse the connections between the pressure line 126 and vent 132 and the rod and head end conduits 128 and 130 of cylinder 44 upon energization of a solenoid V2S. With the connections of valve V2 in the position illustrated in FIGURE 7, the hammer is located in its retracted position. Upon reversal of the connections by the energization of solenoid V2S the hammer is impelled upwardly to impact the head forming core.

A manually operated four-way reversing designated generally 136 is employed to connect the die half operating cylinders 18 and 20 in parallel with each other to the pressure conduit 138 of hydraulic source 120. Valve 136 is provided with a sump connection 140 and by manual actuation of the valve, the piston rods of cylinders 18 and 20 can be extended or retracted. A limit switch LS4, schematically illustrated in FIGURE 6, is located to be actuated when die halves 14 and 16 are in their closed position by the extending of the piston rods of motors 18 and 20.

A similar manually actuated four-way reversing valve 142 is provided to control actuation of inner core cylinder 38, valve 142 being connected to pressure conduit 138 and to a sump connection 144 and being operable to actuate the piston rod of motor 38 in either direction according to the position of valve 142. A second limit switch LS1 is suitably located upon the machine frame to be actuated when inner core 32 is in its closed position, to which it is driven by the extension of the piston rod of cylinder 38.

Lift motors 30 are connected in parallel to pressure conduit 138 and a sump connection 146 by a four-way reversing valve 133 normally biased to the illustrated position by a spring 148, in which position the hydraulic connections are such that the piston rods of cylinders 30 are fully retracted. Upon energization of a valve actuating solenoid V3S, the hydraulic connections between motors 30 and the pressure and sump connections 138 and 146 are reversed to cause motors 30 to stroke upwardly to elevate the head forming core.

An electrical control circuit for controlling the operation of valves V2 and V3 is shown in FIGURE 8. The function of this circuit is best understood when combined with a description of the manner of operation of the apparatus of FIGURES 1 through 5.

OPERATION

At the beginning of a casting operation, push button PB1 is depressed to energize a motor starting relay 1M which starts the pump associated with the hydraulic pressure system, motor delay 1M being locked in by its lock-in contacts 1Ma which bypass push button contacts PB1. Manually operated valves 136 and 142 are positioned to locate the piston rods of motors 18, 20 and 38 in their fully retracted position. In FIGURE 1, motor 38 is illustrated in its retracted position, while motors 18 and 20 are in their extended position in which die halves 14 and 16 are closed. When motors 18 and 20 are in their retracted position, die halves 14 and 16 are separated from each other to expose the upper portion of bushing 38. The head forming core platform 26 is located in its lower position, thereby locating head forming core 22 in the position shown in FIGURE 2, and impact cylinder 44 likewise has its piston rod 48 in its fully retracted or unactuated position.

Referring briefly to FIGURE 2, with the parts positioned as described above, the interior of bushing 24 with head forming core 22 in its lowered position forms a cylindrical cup which is exposed by the retraction of die halves 14 and 16 and by the location of inner core 32 in its elevated position. Because die halves 14 and 16 are fully retracted, as is inner core actuating motor 38, neither of limit switches LS1 or LS4 are actuated and hence, referring to the electrical circuit of FIGURE 8, contacts LS1a and LS4a are open, as illustrated, thereby preventing energization of solenoids V2S and V3S which are connected across the electrical power supply lines L1 and L2. After the molten charge is poured, manually operated valve 136 is shifted to drive die halves 14 and 16 to their closed position, shown in FIGURE 1, by supplying pressure to motors 18 and 20 to extend the piston rods. After die halves 14 and 16 have been placed in their closed position, manually operated valve 142 is shifted to cause motor 38 to drive platen 34 and inner core 32 downwardly to their closed position, the cam surface 42 on platen 34 locking the die halves 14 and 16 in their closed position.

At this time, the die assembly is in the position shown in the cross sectional view of FIGURE 2, with the charge of molten metal in chamber 54 having its upper surface at a location below the upper edge of thickened coating portion 74 at approximately the level L indicated by the dotted line in FIGURE 2. During this period of time, the relatively thick coating 74 prevents any substantial loss of heat from the molten metal of the charge, as does the coating 76, 78 on the upper surface of head forming core 22.

With die halves 14 and 16 and inner core 32 in the die closed position, contacts LS1a and LS4a (FIGURE 7) are closed and, upon depression of a push button PB3, a cam operating motor CM is energized. Cam motor CM may take the form of any of several commercially available motor driven cam switches in which a series of cams are driven in rotation by a motor to open and close several switches in various sequences for selected portions of each revolution of the cam motor. Cam motor CM operates, in the diagram of FIGURE 8, five switches, CM1, CM4, CM5, CM6 and CM7 in the sequence to be described below. Contacts CM2 are a set of lock-in contacts which cause the motor CM to drive one complete revolution once the motor is energized by depression of push button PB3.

Cam switch contacts CM4 are closed shortly after contacts CM1 and energize solenoid V3S to shift valve V3 to connect with cylinders 30 to pressure source 120 to cause motors 30 to elevate platform 26 and the head-forming core from the FIGURE 2 position to the FIGURE 3 position. Elevation continues until the charge of molten metal urged upwardly by the elevation of head forming core 22 completely fills the die cavity so that further elevation of head forming core 22 is prevented by the back pressure exerted by the molten metal in the filled cavity. This method affords a rapid and non-turbulent filling of the die cavity, which combined with the coating layers on the cavity walls is especially adapted to fill small or complex portions of a die cavity.

The full pressure of lift cylinders 30 is maintained on the molten metal throughout the solidification step. This pressure is chosen to be quite substantial and is preferably of the order of 1000 p.s.i.

When head forming core 22 reaches the position shown in FIGURE 3, limit switch contacts LS3a are closed. Solenoid V2S, which controls impact cylinder 44 is thereby conditioned to be energized upon the closure of cam motor contacts CM5, CM6 and CM7.

Contacts CM5, CM6 and CM7 are closed by the cam motor CM in sequence to momentarily supply impact cylinder 44 with pressure to drive impact member 46 upwardly to strike head forming core 22 during the period of time while the molten metal within the die cavity is solidifying. While three sets of contacts controlling solenoid V2S are shown, the number of impacts will vary with the time required for solidification, the shape of the casting, and the particular alloy being used.

At the conclusion of the impacting operation, manually operated valves 136 and 142 are shifted to open the die and the casting is removed. Lift cylinders 30 are automatically returned to their retracted position by the opening of either of limit switches LS1, LS4 or cam motor operated contact CM4.

The foregoing description has been directed to one exemplary form of apparatus for carrying out the method of the present invention. Other arrangements of die structure can be employed if capable of achieving the directional and progressive solidification of the casting as described below and illustrated in FIGURES 9a through 11b.

FIGURES 9a and 9b represent cross sectional views taken in axial planes at right angles to each other through the metal within the die cavity during the solidification process. FIGURES 9a and 9b show the approximate location of the solid-liquid state interface in the solidifying metal at an early stage of the solidification, while FIGURES 10a–11b show similar views at successive stages in the solidification of the casting. It should be borne in mind that the solid-liquid interface indicated in these figures is only an approximate one and that as a practical matter rather than a sharp dividing line, a rather vaguely defined band exists between the solid and liquid portions of the metal which can best be described as a semi-solid or semi-liquid region.

The piston casting shown in the drawings is of a relatively complex shape insofar as the problem of achieving directional and progressive solidification is concerned.

This is because the casting includes relatively thin sections in the skirt region and relatively thick or heavy sections at the wrist pin bosses and head sections. To achieve the desired object of a fine grained, dense, non-porous casting, a first consideration is to achieve a rapid cooling of the molten metal from its liquid state through solidification down to a temperature 100° to 200° below the normal solidification temperature which is 1050° F.–1150° F. for the aluminum alloys under consideration.

Two important results are achieved by accelerating the cooling of the casting. First, the rapid cooling achieves a finer grain structure in that the solidifying crystals of the molten metal tend to solidify into a large number of relatively small crystals when rapidly cooled, whereas with a slower cooling rate the crystals tend to become much larger. Second, with the aluminum alloys, the silicon, copper, magnesium and other constituents are in solution with the aluminum at the elevated temperatures of the molten metal. As the temperature is lowered, the alloying constituents such as silicon, etc., tend to go out of solution, and the slower the cooling rate, the greater amount of alloying materials go out of solution. By rapid cooling, a super saturated solid solution is obtained, i.e. more of the silicon, copper and other elements remains in solution with the aluminum than would normally be the case. This particular characteristic not only achieves a more uniform crystal structure within the metal, but also possesses certain advantages for heat treating and hardness of the resultant casting.

The accelerated overall cooling is achieved by the various water cooling passages which accelerate the rate at which heat is carried off from the solidifying metal within the cavity.

With the general object of accelerating the cooling of the entire casting in mind, the function of the various coatings on the die walls is more accurately described in terms of providing a time delay for cooling certain portions of the casting rather than varying the rate of cooling at certain localized regions. While the coating does have some influence on the rate of cooling, the primary function of the coating is to minimize the loss of heat from a certain portion of the casting for a selected time interval and then, once the time interval is concluded, to permit that portion of the casting to be cooled as rapidly as possible. This feature is achieved by locating cooling passages within the die structure in close proximity to most of the coated portions. As explained above, the thermal characteristics of the coating are such that it resists being heated, but once thoroughly heated, possesses a far lower resistance to heat to permit a reasonably rapid flow of heat through the coating once the coating is raised to an elevated temperature.

Referring to FIGURES 9a and 9b, there is shown an initial stage in the solidifying of the casting in which solidification has progressed downwardly from the top of the skirt and a thin shell of solidified metal is beginning to form over the top of the wrist pin openings. A somewhat thicker region of solid metal is formed at the top of the wrist pin boss indicated at 200 than at the boundary of the interior of the wrist bin bore at 202, and this discrepancy is explained by the presence of the coating layer 80 (FIGURE 2) on the upper half of wrist pin opening forming projections 64, 66. From the cross sectional view of FIGURE 9b, it will be noted that although isolated bodies of molten metal appear to be present in the cross sectional view of FIGURE 9a, in FIGURE 9b it is seen that these regions are in communication with the main body of molten metal in the lower portion of the casting.

Figure 10A:
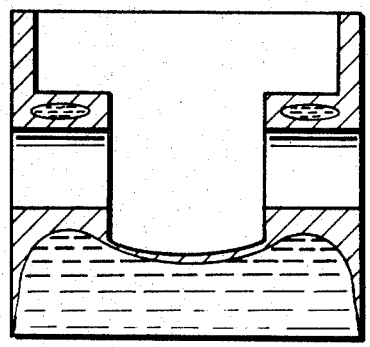
Figure 10B:
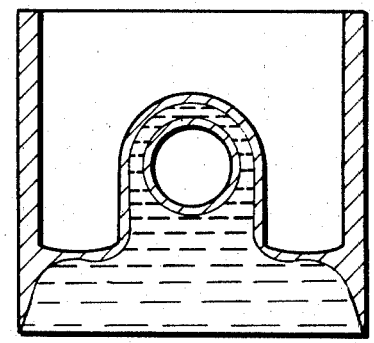

In FIGURES 10a and 10b a somewhat later stage in the solidification process is shown, again the small bodies of molten metal above the wrist pin openings being still in communication with the main body of molten metal in the lower portion of the casting. While cooling passages 92 in the wrist pin opening forming projections and 94 in the upper portion of bushing 24 are actively extracting heat from the unsolidified portions of the casting as shown in FIGURES 10a–10b, it must be borne in mind that these portions of the casting have an extremely heavy section of molten metal and thus have a substantial heat content as compared to the somewhat thinner sections above the wrist pin opening and in the skirt region of the piston.

Figure 11A:
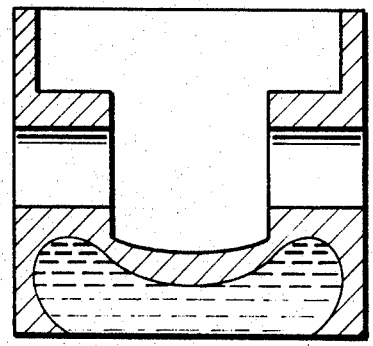
Figure 11B:
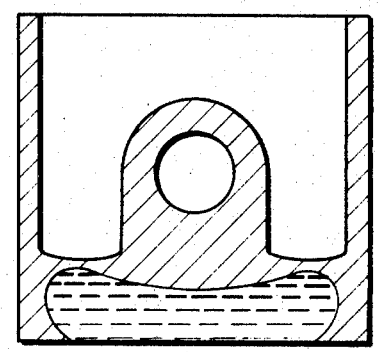

FIGURES 11a and 11b show a subsequent stage in the solidification process in which the body of metal in the liquid phase gradually shrinks, with the last portion of the liquid metal to solidify being located in approximately the center of the end face of the piston.

It will be noted that throughout the solidification, no portion of the metal which is still in its liquid phase is ever completely surrounded by firmly solidified metal. This feature prevents the formation of pores caused by solidification shrinkage, i.e. the substantial reduction in volume which occurs when the metal changes from its liquid to its solid state. After the stage of solidification shown in FIGURES 11a and 11b, a skin of semisolid begins to extend across the end face of the piston. However, this skin remains in a semisolid condition throughout the final stages of solidification to a degree sufficient to maintain pressure on all still molten metal until the metal firmly solidifies.

In addition to the continued application of pressure to the liquid metal throughout the solidification process, a series of high energy impacts are applied to the solidifying casting by impact cylinder 44 and impact element 46. The impacting of the solidifying casting is effective primarily upon those portions of the casting where the metal is in a semisolid or semiliquid state and acts to apply a shock-wave to the semisolid metal which achieves a packing effect on the crystals and some plastic deformation of the crystals which results in a denser crystal formation. The shock wave generated by the impact travels through the still liquid metal with little effect and does not have any substantial effect upon those portions of the casting which have already completely solidified. However, in those regions of the casting where the crystals of solidification are being formed, the impacting effect influences the crystal structure to improve the density and ultimate strength of the completed casting.

While one embodiment of the invention has been described in detail it will be apparent to those skilled in the art that the disclosed embodiment may be modified. Therefore, the foregoing description is to be considered exemplary, rather than limiting, and the true scope of the invention is that defined in the following claims.

I claim:

1. A die assembly for permanent mold casting of a piston having a relatively thin skirt and a relatively thick head comprising a plurality of separable die elements cooperable to define a closed die cavity corresponding in shape to the piston to be cast, one of said die elements defining the piston head end wall of the cavity and other of said die elements defining the outer skirt wall of the cavity, cooling means in said die elements for accelerating the solidification of molten metal within said cavity, and thermally resistant coating means on the piston head end wall and outer skirt of said cavity, said coating means being relatively thin adjacent the skirt end of said cavity and relatively thick adjacent the head end of said cavity to cause molten metal in the cavity to solidify progressively from the skirt end of the cavity toward the head end of the cavity to maintain all still molten metal in the cavity in contact with the head end wall of the cavity throughout the solidification process.

2. A die assembly as defined in claim 1 wherein said one of said die elements is mounted for sliding movement toward and away from said cavity, and fluid pressure means coupled to said one of said die elements for maintaining pressure upon molten metal within the cavity throughout the solidification process.

3. A die assembly as defined in claim 2 further comprising impacting means for delivering a series of high energy impacts to said one of said die elements during the solidification process.

4. A die assembly as defined in claim 1 wherein a second of said die elements includes means defining a bore, said one of said die elements being slidably mounted within said bore, fluid pressure means for moving said one of said elements within said bore between an operative position where said one of said elements defines a wall of the die cavity and a retracted position in which said one of said elements is withdrawn from its operative position, means for moving the remaining die elements between opposite end limits corresponding to the open and closed position of said die assembly, said bore and said one of said die elements cooperatively defining a chamber for receiving a cavity filling charge of molten metal while said remaining die elements are in their open position, and a relatively thick thermally resistant coating on the wall of said bore exetending between the respective positions occupied by said one of said die elements in its operative and retracted position for minimizing heat loss from a charge of molten metal in said chamber.

5. A die assembly for permanent mold casting of an article comprising a plurality of separable die elements cooperable to define a closed die cavity corresponding in shape to the article to be cast, one of said die elements being movable toward and away from the die cavity to constitute a movable wall of said cavity, fluid pressure operated means coupled to said one of said die elements and operable to force said one of said die elements inwardly of said cavity to exert pressure upon a charge of molten metal within said die cavity while said charge is solidifying, means for circulating coolant through said die elements adjacent the cavity to accelerate the solidification of molten metal in said cavity, and a thermally resistant coating on the cavity defining surfaces of selected ones of said die elements for locally retarding the cooling of selected regions of molten metal in said cavity, to cause the metal in the cavity to solidify progressively from the portions of the cavity remote from said one element toward the movable wall defined by said one element.

6. A die assembly as defined in claim 5 wherein said thermally resistant coating is a metallic oxide having relatively low thermal conductivity characteristics at low temperatures and having higher thermal conductivity characteristics in the temperature range at which the molten metal solidifies.

7. A die assembly as defined in claim 6 wherein the article to be cast is a piston having a relatively thin skirt and a relatively thick head, said one of said die elements constituting the piston head end wall of said cavity, said coating being located on said head end wall and upon the sidewalls of the cavity defining the outer skirt surfaces of the piston, the coating on said side walls of said cavity being relatively thin adjacent the skirt end of the piston and being relatively thick on the side walls adjacent said head end wall and upon said head end wall.

8. The method of making a permanent mold casting comprising the steps of filling and sealing within a closed die cavity a charge of molten metal, cooling the die to accelerate the solidification of the molten metal within the cavity, regulating the rate of cooling of localized regions of the molten metal within the cavity by increasing the thermal conductivity of the cavity walls adjacent said localized regions from a relatively low conductivity when said cavity is first filled to a higher conductivity as said molten metal is solidified to cause the molten metal to solidify progressively toward a selected portion of the cavity wall to continuously maintain communication of all molten metal in said cavity with said selected portion of the cavity wall throughout the solidification process, and continuously applying pressure to said selected portion of said cavity wall through the solidification process to maintain the molten metal under pressure throughout the solidification process.

9. The method defined in claim 8 further comprising the step of applying a series of high energy impacts to said selected portion of said cavity wall while the metal is solidifying.

References Cited

UNITED STATES PATENTS

| | | | |
|---|---|---|---|
| 779,192 | 1/1905 | Vellino | 164—348 X |
| 653,133 | 7/1900 | Carpenter | 164—348 |
| 1,062,289 | 5/1913 | Maxwell | 164—71 X |
| 1,347,728 | 7/1920 | Wills | 164—120 |
| 1,608,683 | 11/1926 | Udale | 164—348 X |
| 1,642,541 | 9/1927 | Ellinwood. | |
| 1,908,170 | 5/1933 | Naugle et al. | 164—123 X |
| 2,953,826 | 9/1960 | Larsh | 164—348 X |
| 2,957,215 | 10/1960 | Nelson | 164—71 |
| 3,181,211 | 5/1965 | Rearwin | 164—71 |
| 3,318,370 | 5/1967 | Groteke et al. | 164—348 X |
| 3,322,184 | 5/1967 | Cofer et al. | 164—123 X |

FOREIGN PATENTS

| | | |
|---|---|---|
| 604,200 | 6/1948 | Great Britain. |

J. SPENCER OVERHOLSER, Primary Examiner

R. S. ANNEAR, Assistant Examiner

U.S. Cl. X.R.

164—120, 123, 125, 319